(12) United States Patent
Kruglick

(10) Patent No.: US 8,858,324 B2
(45) Date of Patent: Oct. 14, 2014

(54) SPECULATIVE RENDERING USING HISTORICAL PLAYER DATA

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 34 days.

(21) Appl. No.: 13/519,730

(22) PCT Filed: Nov. 10, 2011

(86) PCT No.: PCT/US2011/060164
§ 371 (c)(1),
(2), (4) Date: Jun. 28, 2012

(87) PCT Pub. No.: WO2013/070228
PCT Pub. Date: May 16, 2013

(65) Prior Publication Data
US 2013/0123004 A1  May 16, 2013

(51) Int. Cl.
*A63F 13/12* (2006.01)
*A63F 13/30* (2014.01)

(52) U.S. Cl.
CPC ......... *A63F 13/12* (2013.01); *A63F 2300/5533* (2013.01); *A63F 2300/538* (2013.01); *A63F 2300/534* (2013.01)
USPC ....................................................... 463/29

(58) Field of Classification Search
CPC ......... A63F 13/02; A63F 13/10; A63F 13/12; A63F 2300/66; A63F 2300/6661; A63F 2300/64; A63F 2300/63; A63F 2300/632; A63F 2300/5533; A63F 2300/50; A63F 2300/51; A63F 2300/40; A63F 2300/534; A63F 2300/538

USPC .................. 463/29, 30, 31, 40, 41, 42, 43
See application file for complete search history.

(56) References Cited

U.S. PATENT DOCUMENTS 7,240,162 B2  7/2007  de Vries
7,515,156 B2  4/2009  Tinker et al.
2011/0162005 A1  6/2011  Yerli

OTHER PUBLICATIONS

Correa et al., "Visibility-based prefetching for interactive out-of-core rendering," in Proceedings of the 2003 IEEE Symposium on Parallel and Large-Data Visualization and Graphics (IEEE Computer Society, 2003) 8 pages.
Lau et al., Motion Prediction for Online Gaming;Department of Computer Science, A. Egges, A. Kamphuis, and M. Overmars (Eds.): MIG 2008, LNCS 5277, pp. 104-114, 2008.© Springer-Verlag Berlin Heidelberg 2008, 11 pages.

(Continued)

*Primary Examiner* — David L Lewis
*Assistant Examiner* — Matthew D Hoel
(74) *Attorney, Agent, or Firm* — Turk IP Law, LLC

(57) ABSTRACT

Technologies are presented for reducing lag time via speculative graphics rendering in cloud based gaming. In some examples, historical data about statistically relevant large populations of players is provided. The historical data may include state transitions through various game locations or situations. In some of the game locations there may be a correlation between a probability of a particular upcoming scene and a player state. Example game locations or situations may include areas that players tend to cross in one or more straight lines, corners that players may round in a particular fashion, spots where certain player motions are commonly engaged in, such as looking up, and the like. The historical data may be tested against a certain predictive strength and rendered predicted game states may be prepared ahead of player need.

20 Claims, 7 Drawing Sheets

(56) References Cited

OTHER PUBLICATIONS

Shi et al., Using Graphics Rendering Contexts to Enhance the Real-Time Video Coding for Mobile Cloud Gaming, Proceedings of the 19th ACM International Conference on Multimedia, Nov. 28-Dec. 1, 2011, p. 103-112 (Online) Association for Computing Machinery, retrieved from the internet [Mar. 21, 2012] Retrieved from URL: http://www.cs.clemson.edu/~jzwang/1201863/mm2011/p103-shi.pdf.

International Search Report and Written Opinion PCT/US11/60164 filed Nov. 10, 2011, mailed Apr. 10, 2012.

International Preliminary Report on Patentability for PCT/US2011/060164 filed Nov. 10, 2011, mailed on May 22, 2014, issued May 13, 2014.

SPECULATIVE RENDERING USING HISTORICAL PLAYER DATA

BACKGROUND

Unless otherwise indicated herein, the materials described in this section are not prior art to the claims in this application and are not admitted to be prior art by inclusion in this section.

Delay time or "lag" may be a challenge in cloud based gaming. Humans may perceive lag somewhere around 150-200 milliseconds and network round trips may be about that long by themselves with a reasonably good connection. It may be desirable to reduce rendering time of computer graphics in data centers even as the network continues to improve.

Speculative operation in a microprocessor or browser may include using otherwise slack time to proceed with a calculation using "speculative" input values. A processor may calculate an output before the inputs may be available, for example, and simply discard the results if the inputs are not as expected when they arrive. However, speculative graphics rendering may not be feasible in current cloud-based gaming systems because the many possible behaviors and perspectives of players present a vast number of potential predicted views. Conventional approaches employ speculative data fetching based on lines of view, but this may not be enough to reduce lag in some situations.

The present disclosure appreciates that reducing perceived lag time in cloud based gaming systems may be a challenging endeavor.

SUMMARY

The present disclosure generally describes technologies for speculative graphics rendering in cloud-based gaming.

According to some examples, a method for speculative graphics rendering in cloud-based gaming is provided. The method may include: detecting a first game state of a game client; identifying a state transition based on the first game state; determining a predicted game state according to whether a probability for one or more potential subsequent states associated with the identified state transition exceeds a probability threshold; rendering the predicted game state; detecting a second game state of the game client; determining whether the second game state corresponds to the rendered predicted game state; and if the second game state corresponds to the rendered predicted game state, transmitting the rendered predicted game state to the game client; else rendering the detected second game state of the game client.

According to various examples, a cloud-based game server adapted to speculatively render game states is provided. The cloud-based game server may include a memory; and a processor coupled to the memory. The processor may be configured to: detect a first game state of a game client; identify a state transition based on the first game state; determine a predicted game state according to whether a probability for one or more potential subsequent states associated with the identified state transition exceeds a probability threshold; render the predicted game state; detect a second game state of the game client; determine whether the second game state corresponds to the rendered predicted game state; and if the second game state corresponds to the rendered predicted game state, transmit the rendered predicted game state to the game client; else render the detected second game state of the game client.

According to further examples, a computer-readable storage medium having instructions stored thereon for speculative graphics rendering in cloud-based gaming is provided. The instructions may include: detecting a first game state of a game client; identifying a state transition based on the first game state; determining a predicted game state according to whether a probability for one or more potential subsequent states associated with the identified state transition exceeds a probability threshold; rendering the predicted game state; detecting a second game state of the game client; determining whether the second game state corresponds to the rendered predicted game state; and if the second game state corresponds to the rendered predicted game state, transmitting the rendered predicted game state to the game client; else rendering the detected second game state of the game client.

According to some examples, a cloud-based game server for speculatively rendering game states is provided. The cloud-based game server may include a memory; and a processor coupled to the memory. The processor may be configured to: detect a first game state of a game client; identify a state transition based on the first game state; determine a number of predicted game states according to whether the probability for the one or more potential subsequent states associated with the identified state transition exceeds the probability threshold defined based on one or more of a game rule, a game scenario, a usage history of the game client, a usage history of a group of game clients, a computational cost, and/or a network cost; determine a computational load for rendering each of the predicted game states; render one or more of the predicted game states based on the probability and the computational load associated with rendering each predicted game state; detect the second game state of the game client; determine whether the second game state corresponds to one of the one or more rendered predicted game states; if the second game state corresponds to one of the one or more rendered predicted game states, transmit the one or more corresponding rendered predicted game states to the game client; and discard remaining rendered predicted game states that do not correspond to the second game state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
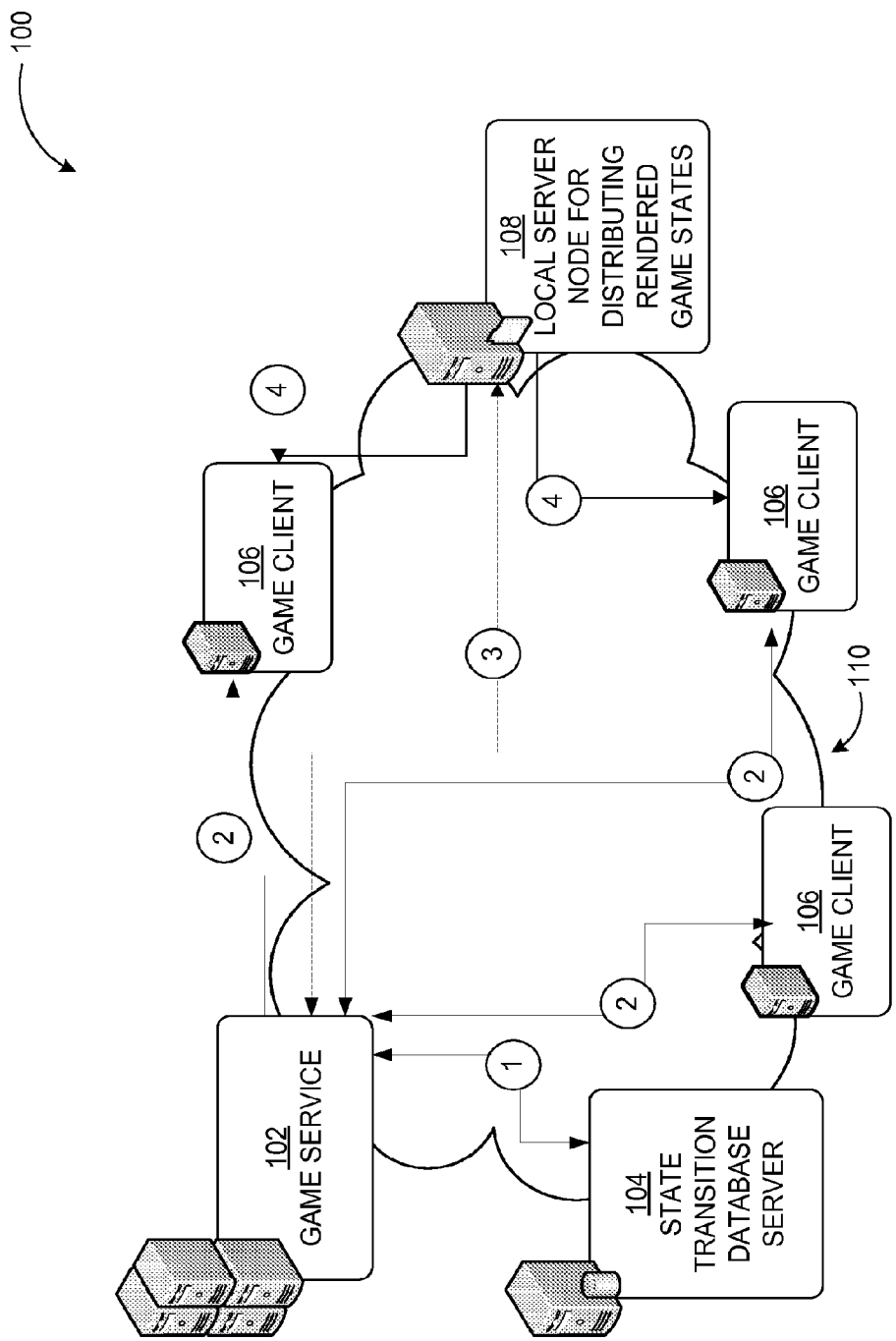
FIG. 1 illustrates an example cloud-based system for speculative graphics rendering.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to speculative graphics rendering for cloud-based gaming.

Briefly stated, technologies are presented for reducing lag time via speculative graphics rendering in cloud based gaming. Historical data about statistically relevant large populations of players may be provided. The historical data may include state transitions through various game locations or situations. In some of the game locations or situations there may be a correlation between a probability of a particular upcoming scene and a player state. Example game locations or situations may include areas that players tend to cross in one or more straight lines, corners that players may round in a particular fashion, spots where certain player motions may be commonly engaged in, such as looking up, relatively static scenes, and the like. The historical data may be tested against a certain predictive strength and predictive states may be prepared ahead of player need.

FIG. 1 illustrates an example cloud-based system 100 for speculative graphics rendering, in accordance with at least some embodiments described herein. The system 100 may include a cloud-based game service 102, which may be implemented on one or more physical computing devices. The cloud-based game service 102 may be coupled via a cloud network 110 to a state transition database server 104 via a network pathway 1. The cloud-based game service 102 may be coupled via the cloud network 110 to one or more game clients 106 via network pathways 2. In some examples, the cloud-based game service 102 may prepare and deliver rendered predicted game states to game clients 106. In other examples, a local server node 108 may be employed for preparing and/or distributing rendered predicted game states to one or more of the game clients 106 via network pathways 4. A local server node 108 may further reduce lag time for transmitting rendered predicted game states. For example, the local server node 108 may reduce lag time for rendered predicted game states by being located physically closer to some of the game clients 106 than the game service 102. The local server node 108 may also reduce lag time for rendered predicted game states by easing the computational load on the game service 102. The local server node 108 may also reduce lag time for rendered predicted game states by easing the network load on the cloud network 110.

Figure 2:
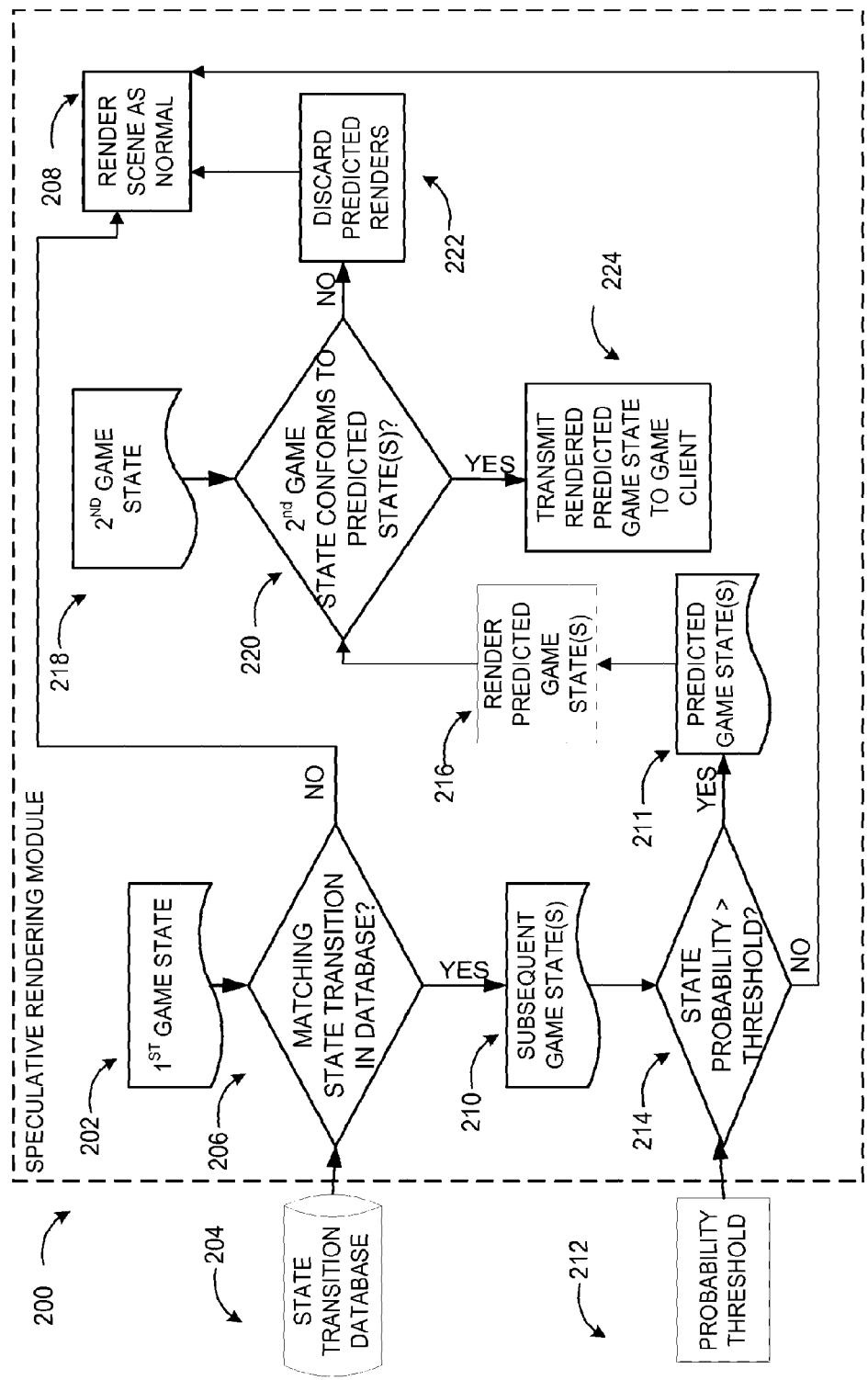
FIG. 2 illustrates a functional block diagram of a speculative graphics rendering module.

FIG. 2 illustrates a functional block diagram of an example speculative graphics rendering module 200, in accordance with at least some embodiments described herein. The speculative graphics rendering module 200 may detect a first game state 202 and search a state transition database 204 for a matching state transition based on the first game state 202 at block 206.

As used herein, each "state transition" in the state transition database 204 includes an initial game state, one or more subsequent game states, and a probability for each of the one or more subsequent states based on the initial game state. In other examples of the "matching state transition", the initial game state may be substantially the same as the first game state 202. As used herein, the subsequent states of a particular state transition may be game states historically observed to follow the corresponding initial state. The probability for each of the one or more subsequent states may be the historically observed frequency of each of the subsequent state occurring after the corresponding initial state.

If the state transition database 204 does not include the matching state transition, the speculative graphics rendering module 200 may proceed to render a scene normally at block 208, e.g., based on the second game state 218. If the state transition database 204 does include the matching state transition, the speculative graphics rendering module 200 may compare the corresponding probability of the one or more potential subsequent game states 210 from the state transition database 204 with a provided probability threshold 212 at block 214.

If the probability of at least one of the one or more subsequent game states 210 does not exceed the probability threshold 212, the speculative graphics rendering module 200 may proceed to render a scene normally at block 208, e.g., based on the second game state 218. If the probability of at least one of the one or more subsequent game states 210 exceeds the probability threshold 212, one or more predicted game states 211 may be drawn from the one or more subsequent game states 210. The one or more predicted game states 211 may be rendered at block 216.

The speculative graphics rendering module 200 may detect a second game state 218 and determine at block 220 whether there may be a match with the one or more predicted game states 211. If there is no match between the second game state 218 and the one or more predicted game states 211, the rendered predicted game states may be discarded at block 222. A scene may then be rendered normally at block 208, e.g., based on the second game state 218. If there is a match between the second game state 218 and one of the one or more predicted game states 211, the corresponding rendered predicted game state may be transmitted to the game client at block 224. Rendered predicted game states that do not correspond to the second game state 218 may be discarded.

As used herein, "speculative graphics rendering" refers to computationally creating a game scene or components of the game scene based on the predicted game state. In some examples, speculative graphics rendering of the game scene may begin before the second game state is entered by the game player. In some examples, speculative graphics rendering of the game scene may be completed before the second game state is entered by the game player. As used herein, a "rendered predicted game state" refers to the game scene or components of the game scene created by rendering the predicted game state.

As used herein, "lag time" refers to the time taken from when one of the game clients 106 enters a particular game state, such as the second game state 218, to when the game client 106 displays rendered predicted game state corresponding to the second game state 218 to a human game player. In cloud-based games, where aspects of gameplay may be computed by the cloud-based game service 102, numerous factors may be included in lag time. For example, the lag time may include: the time for one of the game clients 106 to transmit the first game state 202 across pathways 2 in the cloud 110 to the game service 102; the time for the game service 102 to render a scene; the time to transmit one of the rendered scenes from the game service 102 across pathways 2 in the cloud 110 to one of the game clients 106; and the like. Thus, the lag time may include computational time associated with detecting game states and rendering scenes corresponding to game states. Likewise, the lag time may also include network time to transmit game states and deliver rendered scenes. Humans may perceive lag time somewhere around 150-200 milliseconds. In some examples, the rendered predicted game states may be transmitted to the game client such that the lag time of presenting the rendered predicted game state at the game client may be less than a predefined threshold. The predefined threshold may be, in various examples, less than: 200 milliseconds, 175 milliseconds, 150 milliseconds, 125 milliseconds, 100 milliseconds, 75 milliseconds, 50 milliseconds, 25 milliseconds, or 10 milliseconds.

The examples described herein may reduce the lag time by one or more of the following. The lag time may be reduced by operation of the speculative graphics rendering module 200 in FIG. 2 because identifying the predicted game states 211 and rendering the predicted game states at block 206 may be started or finished before the corresponding game state 218 is reached. When at least one of the predicted game states 211 matches the second game state 218, operation of the speculative graphics rendering module 200 may provide delivery of the corresponding rendered predicted game state in less time that it would take to render the scene as normal in block 208. Also, the lag time may be reduced as depicted in FIG. 1 by providing the local server node 108, which may reduce the network time component of the lag time since the local server node 108 may be located closer to one or more of the game clients 106 compared to the game service 102. Further, the lag time may be reduced as depicted in FIG. 1 by providing the local server node 108, which may reduce the computational burden at the game service 102. According to some examples, the method may include transmitting the corresponding rendered predicted game state from the cloud-based game server 102 to the game client 106 where the lag time may be less than 150 milliseconds from a starting time of the second game state 218.

In some examples, the probability threshold 212 shown in FIG. 2 may be adjusted, for example, decreased in order to increase the likelihood of speculative success. This may result in decreased lag time, and the game system may aim for an optimized combination of increased speculative success and computational/network burden.

As used herein, the probability threshold, e.g., the probability threshold 212, may be employed to identify predicted game states from among subsequent game states in a state transition of interest in the state transition database, as described according to embodiments herein. For example, the probability threshold may be provided or based on one or more of a game rule, a game scenario, a usage history of the game client, a usage history of a group of game clients, a computational cost, and/or a network cost. A game client may be a gaming device, a general/special purpose computing device with a gaming application, or a player account that may enable a player to play on different devices.

Figure 3:
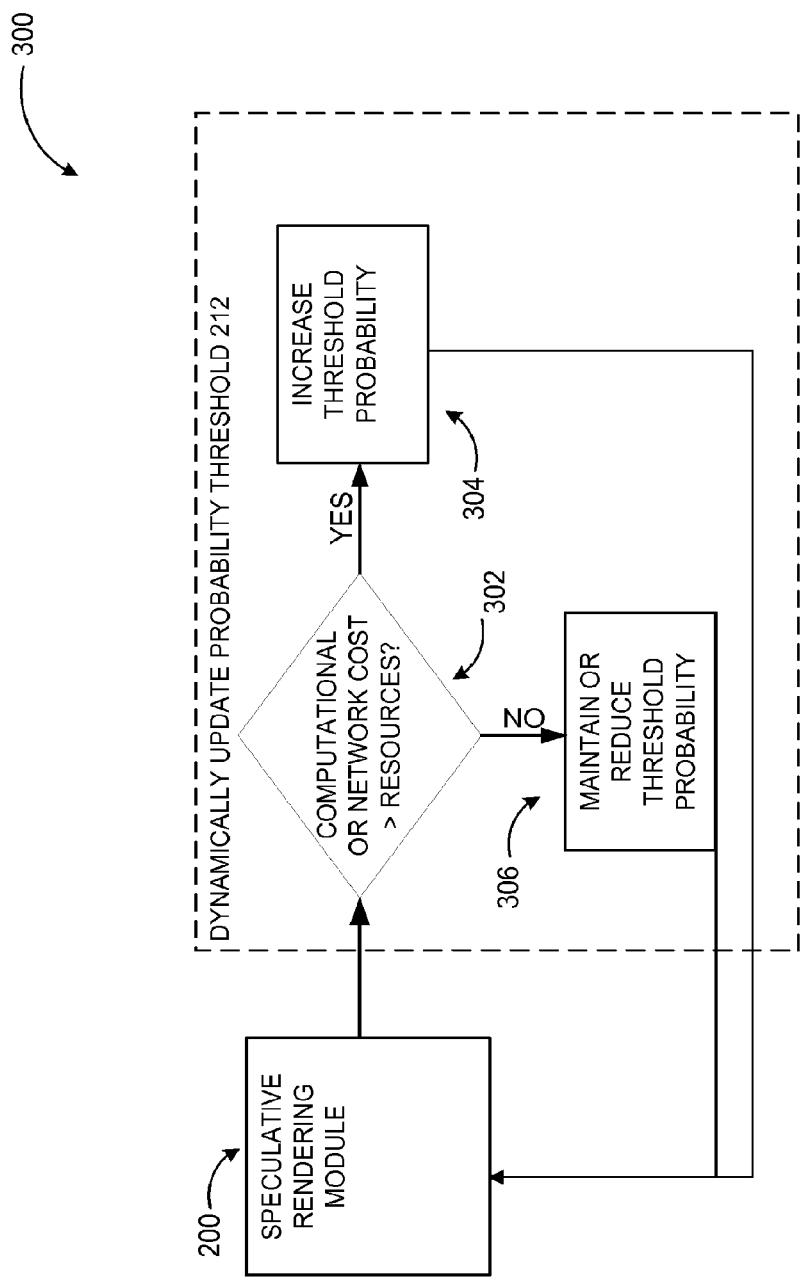
FIG. 3 illustrates a functional block diagram of dynamically updating a probability threshold for speculative graphics rendering based on computational cost.

In various examples, the probability threshold may be a static or dynamic value. FIG. 3 illustrates a functional block diagram of a module 300 for dynamically updating the probability threshold 212 based on computational cost and/or network cost, in accordance with at least some embodiments described herein. Referring back to FIG. 2, the speculative graphics rendering module 200 may be scheduled to render one or more of the predicted game states at block 216 based on the predicted game states 211 according to the probability threshold 212. Referring to FIG. 3, the computational cost of preparing the one or more rendered predicted game states and/or the network cost of transmitting the one or more rendered predicted game states may be compared to available resources at block 302. If the computational cost of rendering the predicted game states and/or the network cost of transmitting the one or more rendered predicted game states exceeds available resources at block 302, the threshold probability 212 may be increased at block 304. Referring back to FIG. 2, when the threshold probability 212 is increased, the speculative graphics rendering module 200 may render correspondingly fewer predicted game states at block 216 and/or transmit correspondingly fewer predicted game states at block 224. Referring to FIG. 3, if the computational cost of rendering and/or transmitting the one or more predicted game states is equal to or less than the available resources at block 302, the threshold probability 212 may stay the same at block 306. In some examples, if the computational cost of rendering the one or more predicted game states and/or the network cost of transmitting the one or more rendered predicted game states is less than the available resources at block 302, the threshold probability 212 may be decreased at block 306. In some examples, the probability threshold may be updated depending on whether the rendered predicted game state corresponds to the detected second game state.

In some examples, a computational load for rendering each predicted game state at the cloud-based game server 102 may be computed; and the probability threshold 212 dynamically adjusted based on the computational load and/or network load using module 300. In other examples, the lag time may be reduced by calculating the network load for transmitting each rendered predicted game state from the cloud-based game server 102 to the game client 106; and transmitting and storing at least a subset of the rendered predicted game states at the game client based on the determined network load. In further examples, the lag time may be reduced by calculating the network load for transmitting each rendered predicted game state from the cloud-based game server 102 to the server node 108 local to the game client 106; and transmitting and storing at least a subset of the rendered predicted game states at the server node 108 based on the determined network load.

The probability corresponding to the predicted states 211 may also be employed to manage computational cost and/or network load. For example, referring back to FIG. 2, one or more of the predicted game states may be rendered with fewer scene components and/or lower scene resolution compared to a fully rendered scene for the corresponding predicted state 211. Alternatively, a game state may be partially rendered, for example, simply composited and the data distributed within the datacenter prior to rendering. In another example, in response to determining the first predicted game state has a greater probability than the second predicted game state, greater computational effort may be expended to render the first predicted game state compared to rendering the second predicted game state. For example, the predicted game states of higher probability may be rendered with more scene components, more detail, or the like compared to the predicted states of comparatively lower probability.

As used herein, "scene components" specify the set of values that define a game scene, non-limiting examples of which include viewpoint, position, and orientation information, graphical entity position and orientation, spatial relationships among graphical entities, the representation of entities in the rendered image (e.g. in one measurement, a hand may be represented as a hand, while in another, it may be represented as another object such as a weapon), and scene and entity color and lighting characteristics. In some examples, other cues such as sound effects, music, haptic signals, or the like may be included.

Figure 4:
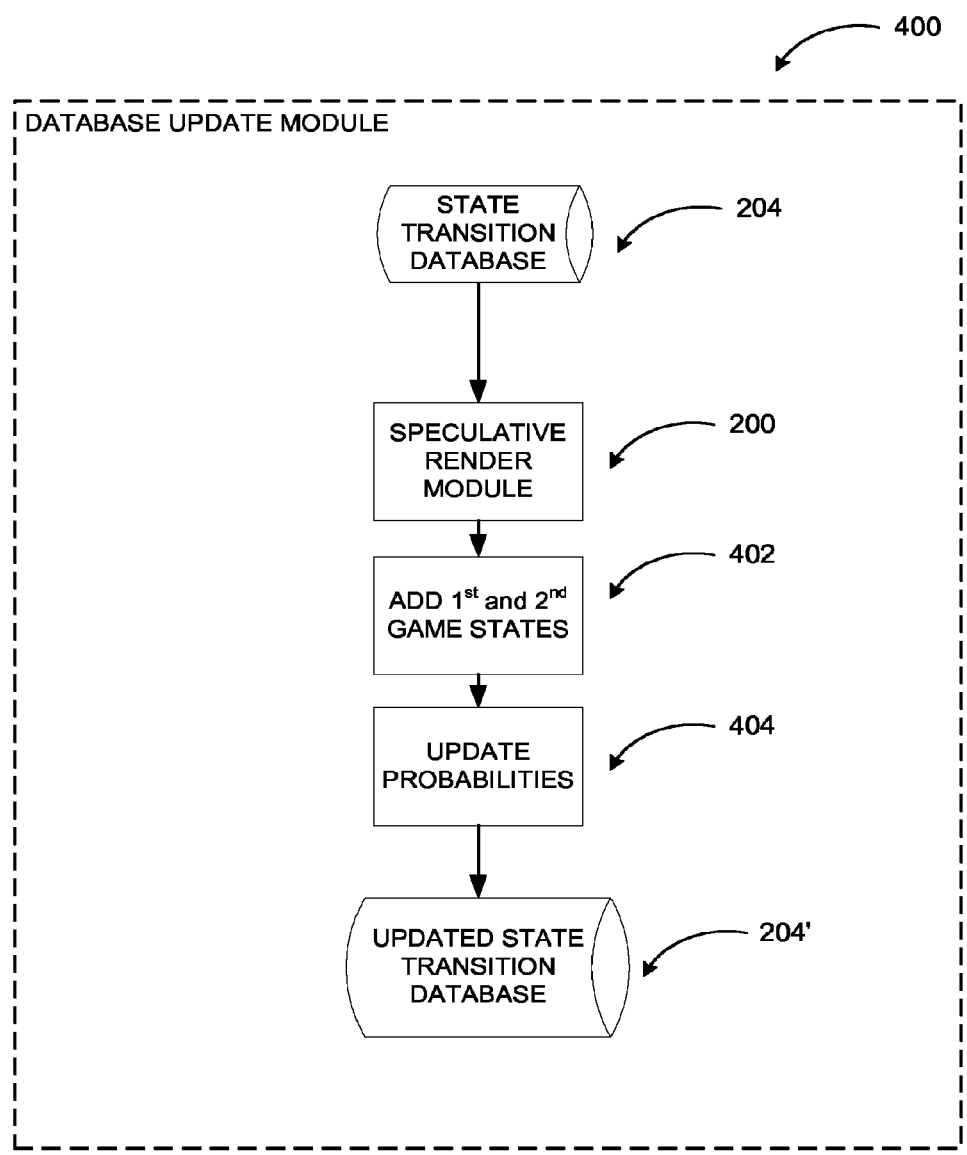
FIG. 4 illustrates a functional block diagram of dynamically updating and growing a game state transition database for speculative graphics rendering.

FIG. 4 illustrates a functional block diagram of a database update module 400 for dynamically updating and growing the state transition database 204, in accordance with at least some embodiments described herein. Referring again to FIG. 2, the speculative graphics rendering module 200 detects the first game state 202 and the second game state 218. The state transition database 204 may be accessed by the speculative graphics rendering module 200 to identify at least one of the state transitions for updating. The identified state transition for updating may be identified by matching the first game state 202 to the initial game state of the identified state transition. Referring to FIG. 4, the first game state 204 and the second game state 218 may be added to the state transition database 204 at block 402, and the state transition probabilities may be updated at block 404 to result in the updated state transition database 204'. In various examples, the database of state transitions may be updated with one of the rendered predicted game state and the second game state depending on whether the rendered predicted game state corresponds to the detected second game state. The database update module 400 may operate in conjunction with the system 100 to dynamically update and grow the state transition database 204. For example, referring to FIGS. 1, 2 and 4, the game server 102 may be operated to engage the game clients 106 in gameplay, and the state transition database 204 may be grown by recording the game state transitions 202 and 208 as generated by gameplay engaged in by the game clients 106.

Figure 5:
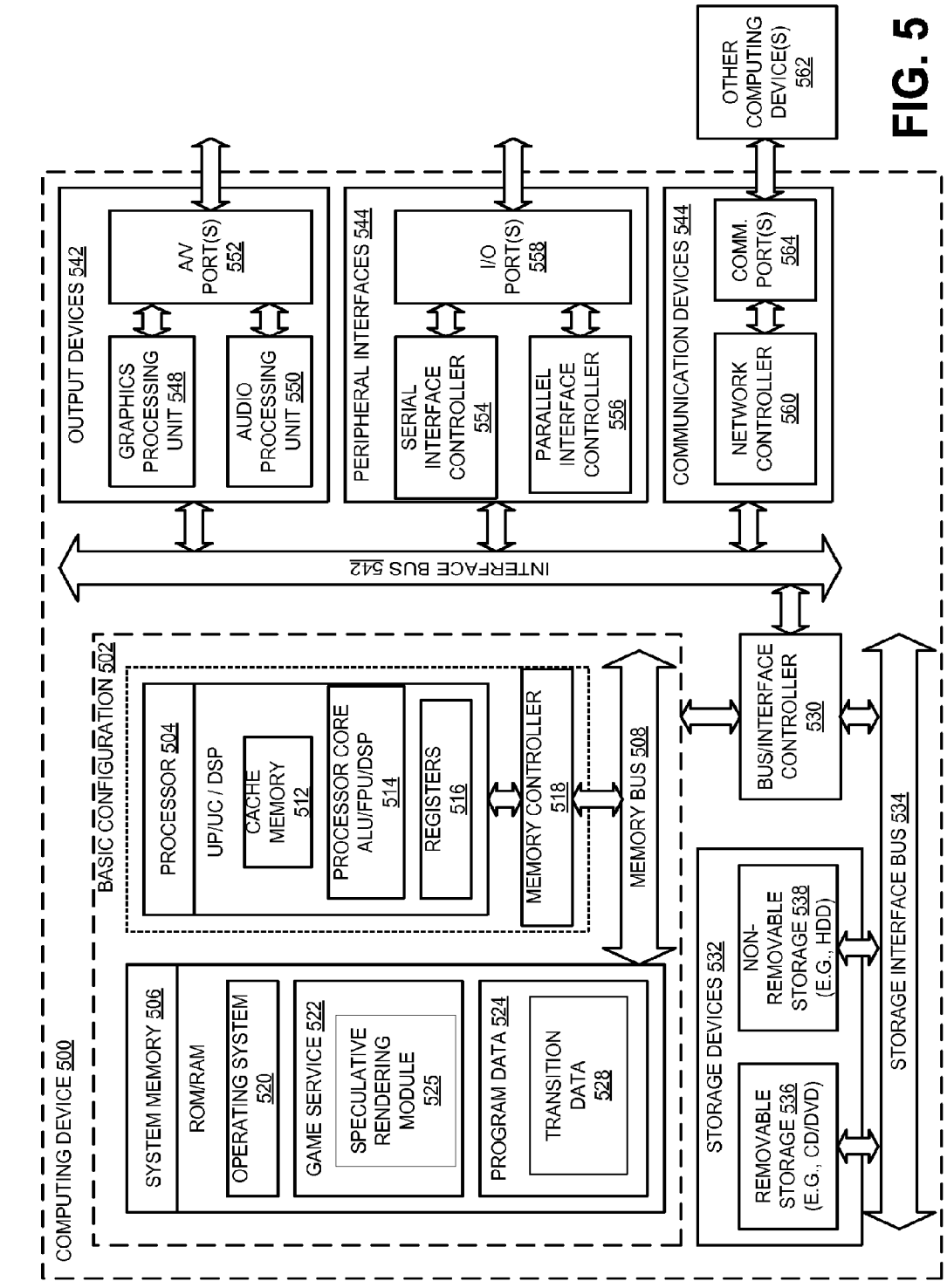
FIG. 5 illustrates a general purpose computing device, which may be used to implement speculative graphics rendering in cloud-based gaming.

FIG. 5 illustrates a general purpose computing device 500, which may be used to implement speculative graphics rendering in cloud-based gaming, in accordance with at least some embodiments described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more game service applications 522, and program data 524. The game service applications 522 may include a speculative graphics rendering module 525, which may provide speculative graphics rendering of game scenes according to predicted game states as described herein. Also included in the game service applications 522 may be the module 300 for dynamically updating probability thresholds, as depicted in FIG. 3. Referring again to FIG. 5, the program data 524 may include, among other data, one or more control parameters 528 associated with the actual or the predicted game states, the threshold probabilities, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include the game clients 106, the local server node 108, and/or the state transition database server 104 as depicted in FIG. 1.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
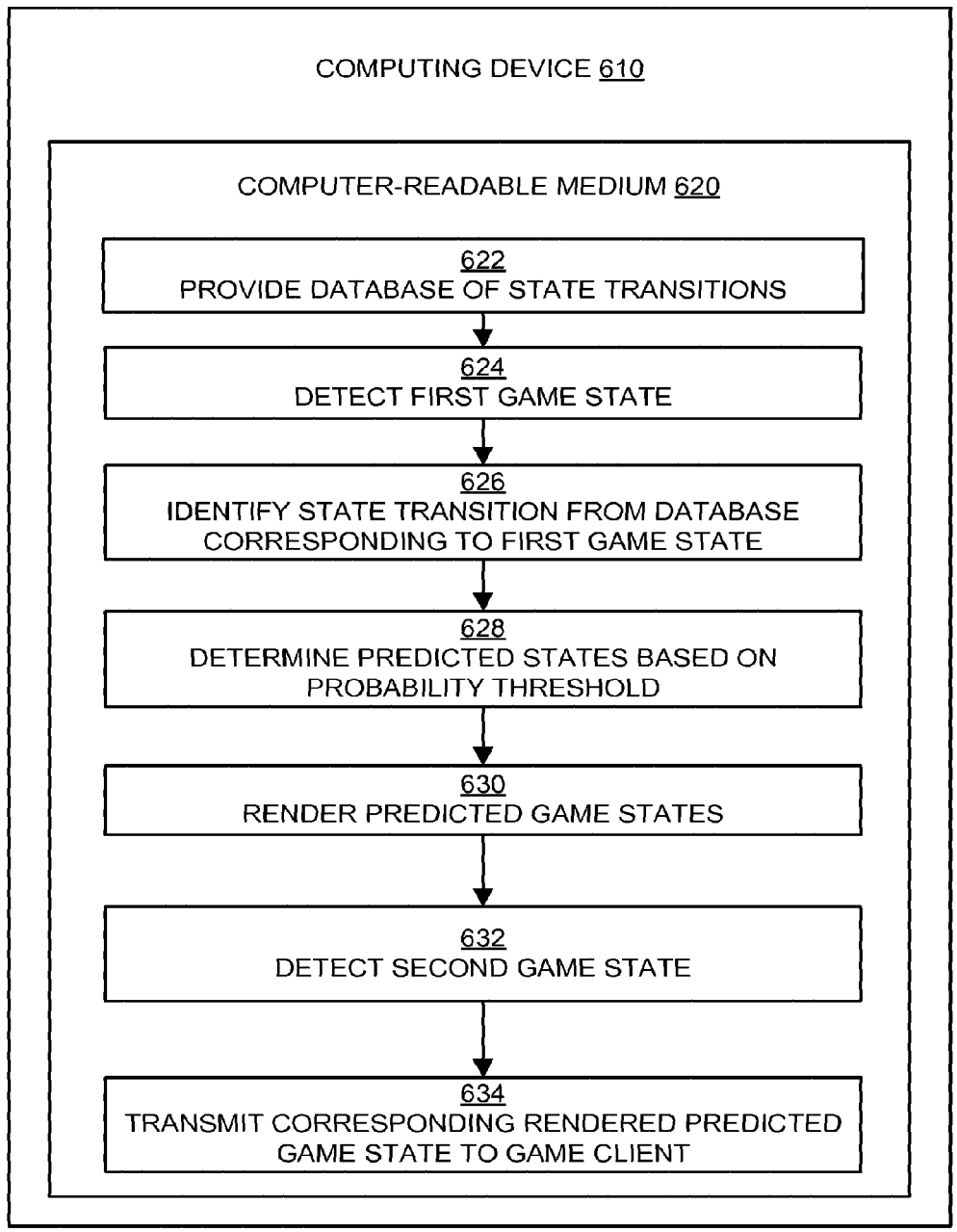
FIG. 6 is a flow diagram illustrating an example method for speculative graphics rendering in cloud-based gaming that may be performed by a computing device such as the device in FIG. 5.

FIG. 6 is a flow diagram illustrating an example method for speculative graphics rendering in cloud-based gaming that may be performed by a computing device such as the device 500 in FIG. 5, in accordance with at least some embodiments described herein. Example methods may include one or more operations, functions or actions as illustrated by one or more of blocks 622, 624, 626, 628, 630, 632, and/or 634. The operations described in the blocks 622 through 634 may also be stored as computer-executable instructions in a computer-readable medium such as a computer-readable medium 620 of a computing device 610.

An example process of speculative graphics rendering in cloud-based gaming may begin with block 622, "PROVIDE DATABASE OF STATE TRANSITIONS", where a number of state transitions may be stored in a state transition database 204 as depicted in FIG. 2 and FIG. 4.

Referring again to FIG. 6, block 622 may be followed by block 624, "DETECT FIRST GAME STATE," where the first game state 202 as depicted in FIG. 2 is detected. Block 624 may be followed by block 626, "IDENTIFY STATE TRANSITION FROM DATABASE CORRESPONDING TO FIRST GAME STATE". At block 626, a state transition may be identified from the state transitions database based on the detected first game state. If a game state is determined not to be in the database, it may be computed and rendered by the system. Block 626 may be followed by block 628, "DETERMINE PREDICTED GAME STATES BASED ON PROBABILITY THRESHOLD", where the game service 102 may identify one or more predicted game states based on comparing the probabilities of identified state transitions to a predefined probability threshold as depicted in FIG. 2.

Referring again to FIG. 6, block 628 may be followed by block 630, "RENDER PREDICTED GAME STATES," where one or more of the predicted game states may be rendered at the server or caused to be rendered at the client. Which (and how many) game states are to be rendered may be determined based on one or more factors such as processing capacity, bandwidth availability, complexity of to be rendered states, etc. Block 630 may be followed by block 632, "DETECT SECOND GAME STATE", where the game service 102 may detect an actual second game state of the player based on an action of the player in the game. Block 632 may be followed by block 634, "TRANSMIT CORRESPONDING RENDERED PREDICTED GAME STATE TO GAME CLIENT", where the corresponding rendered predicted game state is provided or transmitted to the game client. In cases where the server renders the game states, the rendered predicted game state may be transmitted to the client without any delay potentially caused by the rendering process.

The blocks included in the above described process are for illustration purposes. Speculative graphics rendering in cloud-based gaming may be implemented by similar processes with fewer or additional blocks, for example, employing block depicted in FIG. 2 and FIG. 4. In some examples, the blocks may be performed in a different order. In some other examples, various blocks may be eliminated. In still other examples, various blocks may be divided into additional blocks, or combined together into fewer blocks.

Figure 7:
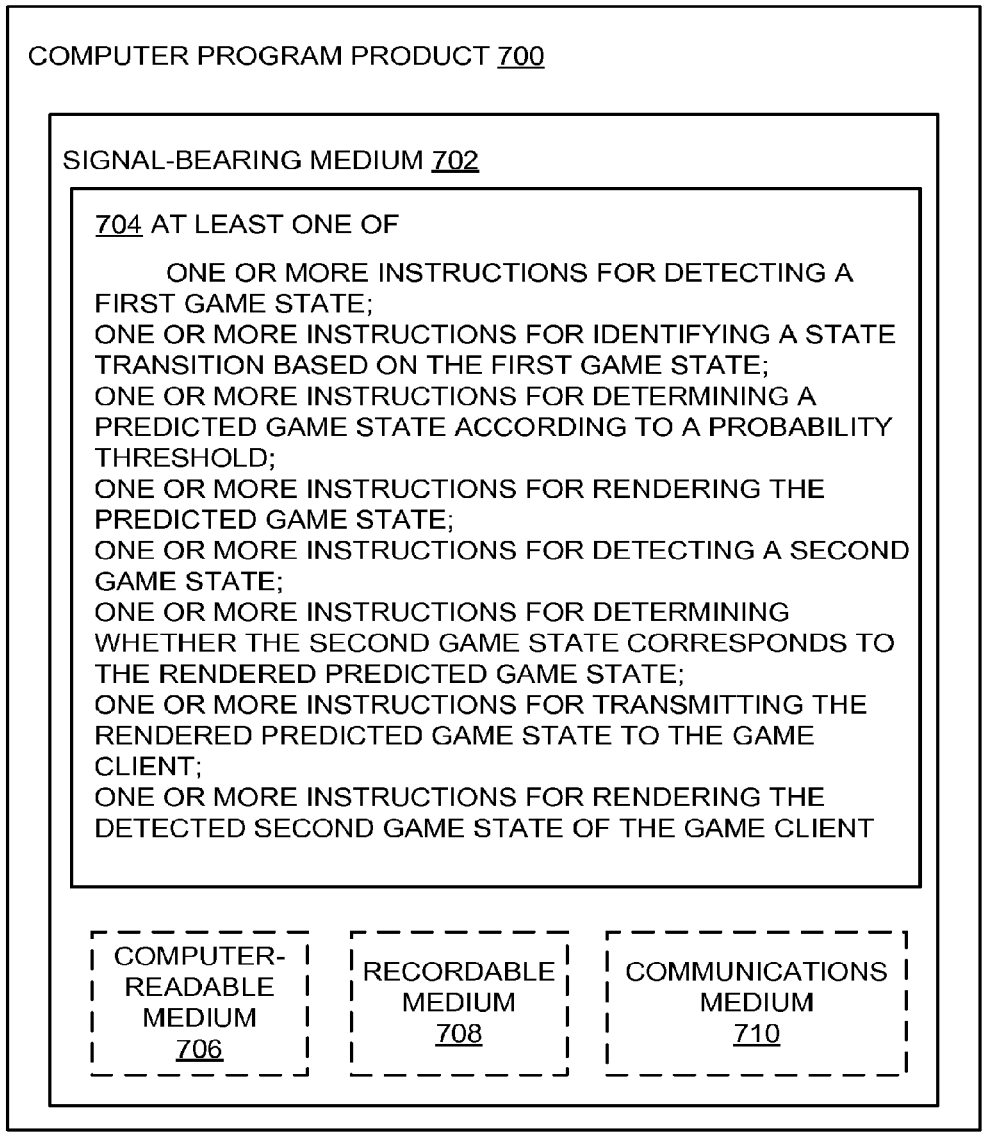
FIG. 7 illustrates a block diagram of an example computer program product; all arranged in accordance with at least some embodiments described herein.

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the data monitoring module 526 may undertake one or more of the tasks shown in FIG. 7 in response to the instructions 704 conveyed to the processor 504 by the medium 702 to perform actions associated with speculative graphics rendering in cloud-based gaming as described herein. Some of those instructions may include, for example, instructions for providing the database of state transitions 204 to the cloud-based game server 102; instructions for detecting the game state 202 of the one or more game clients 106; instructions for identifying the corresponding state transition, e.g., from the state transition database 204; instructions for determining the predicted game states 211 according to the probability threshold 212; instructions for rendering the predicted game states; instructions for transmitting the rendered predicted game states from the cloud based game server 102 to the game client 106; and the like, according to embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method for speculative graphics rendering in cloud-based gaming is provided. The method may include: detecting a first game state of a game client; identifying a state transition based on the first game state; determining a predicted game state according to whether a probability for one or more potential subsequent states associated with the identified state transition exceeds a probability threshold; rendering the predicted game state; detecting a second game state of the game client; determining whether the second game state corresponds to the rendered predicted game state; and if the second game state corresponds to the rendered predicted game state, transmitting the rendered predicted game state to the game client; else rendering the detected second game state of the game client.

In various examples, the method may also include determining the probability threshold based on one or more of a game rule, a game scenario, a usage history of the game client, a usage history of a group of game clients, a computational cost, and/or a network cost.

In some examples, the method may further include determining a number of predicted game states according to whether the probability for the one or more potential subsequent states associated with the identified state transition exceeds the probability threshold; rendering the predicted game states; detecting the second game state of the game client; determining whether the second game state corresponds to one of the rendered predicted game states; if the second game state corresponds to one of the rendered predicted game states, transmitting the corresponding one of rendered predicted game states to the game client; and discarding remaining rendered predicted game states that do not correspond to the second game state.

In various examples, the method may also include determining a network load for transmitting the rendered predicted game states; and transmitting and storing at least a subset of the rendered predicted game states at the game client based on the determined network load.

In some examples, the method may further include, in response to determining a first predicted game state has a greater probability than a second predicted game state, expending additional computational effort to render the first predicted game state compared to rendering the second predicted game state.

In various examples, the method may also include identifying the state transition from a database of state transitions, and updating the database of state transitions with one of the rendered predicted game state and the second game state depending on whether the rendered predicted game state corresponds to the detected second game state.

In some examples, the method may further include updating the probability threshold depending on whether the rendered predicted game state corresponds to the detected second game state.

In various examples, the method may also include dynamically adjusting the probability threshold based on one or more of a computational load for rendering the predicted game state and/or a network load for transmitting the rendered predicted game state.

In some examples, the method may further include rendering the predicted game state partially with one of fewer scene components and/or lower scene resolution compared to a fully rendered predicted game state.

In various examples, the method may also include transmitting the rendered predicted game state to the game client such that a lag time of presenting the rendered predicted game state at the game client is less than a predefined threshold.

The method may further include determining the predicted game state based on one or more game client specific attributes, where the one or more game client specific attributes may include at least one from a set of a position, a view point, equipment, and a character state of the game client at the first game state. The one or more game client specific attributes may further include at least one from a set of an aggressiveness, a speed, and a predictability of the game client at the first game state.

According to various examples, a cloud-based game server adapted to speculatively render game states is provided. The cloud-based game server may include a memory; and a processor coupled to the memory. The processor may be configured to: detect a first game state of a game client; identify a state transition based on the first game state; determine a predicted game state according to whether a probability for one or more potential subsequent states associated with the identified state transition exceeds a probability threshold; render the predicted game state; detect a second game state of the game client; determine whether the second game state corresponds to the rendered predicted game state; and if the second game state corresponds to the rendered predicted game state, transmit the rendered predicted game state to the game client; else render the detected second game state of the game client.

In various examples of the cloud-based game server, the processor may be configured to determine the probability threshold based on one or more of a game rule, a game scenario, a usage history of the game client, a usage history of a group of game clients, a computational cost, and/or a network cost.

In some examples of the cloud-based game server, the processor may be configured to: determine a number of predicted game states according to whether the probability for the one or more potential subsequent states associated with the identified state transition exceeds the probability threshold; render the predicted game states; detect the second game state of the game client; determine whether the second game state corresponds to one of the rendered predicted game states; if the second game state corresponds to one of the rendered predicted game states, transmit the corresponding one of the rendered predicted game states to the game client; and discard remaining rendered predicted game states that do not correspond to the second game state.

In further examples of the cloud-based game server, the processor may be configured to determine a network load for transmitting the rendered predicted game states; and transmit and store at least a subset of the rendered predicted game states at the game client based on the determined network load.

In various examples of the cloud-based game server, the processor may be configured to, in response to determining a first predicted game state has a greater probability than a second predicted game state, expend additional computational effort to render the first predicted game state compared to rendering the second predicted game state.

In some examples of the cloud-based game server, the processor may be configured to identify the state transition from a database of state transitions, and update the database of state transitions with one of the rendered predicted game state and the second game state depending on whether the rendered predicted game state corresponds to the detected second game state.

In further examples of the cloud-based game server, the processor may be configured to update the probability threshold depending on whether the rendered predicted game state corresponds to the detected second game state.

In various examples of the cloud-based game server, the processor may be configured to dynamically adjust the probability threshold based on one or more of a computational load for rendering the predicted game state and/or a network load for transmitting the rendered predicted game state.

In some examples of the cloud-based game server, the processor may be configured to render the predicted game state partially with one of fewer scene components and/or lower scene resolution compared to a fully rendered predicted game state.

In further examples of the cloud-based game server, the processor may be configured to transmit the rendered predicted game state to the game client such that a lag time of presenting the rendered predicted game state at the game client is less than a predefined threshold.

The processor may further determine the predicted game state based on one or more game client specific attributes, where the one or more game client specific attributes may include at least one from a set of a position, a view point, equipment, and a character state of the game client at the first game state. The one or more game client specific attributes may further include at least one from a set of an aggressiveness, a speed, and a predictability of the game client at the first game state.

According to further examples, a computer-readable storage medium having instructions stored thereon for speculative graphics rendering in cloud-based gaming is provided.

In various examples of the computer-readable storage medium, the instructions may include: detecting a first game state of a game client; identifying a state transition based on the first game state; determining a predicted game state according to whether a probability for one or more potential subsequent states associated with the identified state transition exceeds a probability threshold; rendering the predicted game state; detecting a second game state of the game client; determining whether the second game state corresponds to the rendered predicted game state; and if the second game state corresponds to the rendered predicted game state, transmitting the rendered predicted game state to the game client; else rendering the detected second game state of the game client.

In some examples of the computer-readable storage medium, the instructions may include determining the probability threshold based on one or more of a game rule, a game scenario, a usage history of the game client, a usage history of a group of game clients, a computational cost, and/or a network cost.

In further examples of the computer-readable storage medium, the instructions may include: determining a number of predicted game states according to whether the probability for the one or more potential subsequent states associated with the identified state transition exceeds the probability threshold; rendering the predicted game states; detecting the second game state of the game client; determining whether the second game state corresponds to one of the rendered predicted game states; if the second game state corresponds to one of the rendered predicted game states, transmitting the corresponding one of the rendered predicted game states to the game client; and discarding remaining rendered predicted game states that do not correspond to the second game state.

In various examples of the computer-readable storage medium, the instructions may include determining a network load for transmitting the rendered predicted game states; and transmitting and storing at least a subset of the rendered predicted game states at the game client based on the determined network load.

In some examples of the computer-readable storage medium, the instructions may include, in response to determining a first predicted game state has a greater probability than a second predicted game state, expending additional computational effort to render the first predicted game state compared to rendering the second predicted game state.

In further examples of the computer-readable storage medium, the instructions may include identifying the state transition from a database of state transitions, and updating the database of state transitions with one of the rendered predicted game state and the second game state depending on whether the rendered predicted game state corresponds to the detected second game state.

In various examples of the computer-readable storage medium, the instructions may include updating the probability threshold depending on whether the rendered predicted game state corresponds to the detected second game state.

In some examples of the computer-readable storage medium, the instructions may include dynamically adjusting the probability threshold based on one or more of a computational load for rendering the predicted game state and/or a network load for transmitting the rendered predicted game state.

In various examples of the computer-readable storage medium, the instructions may include rendering the predicted game state partially with one of fewer scene components and/or lower scene resolution compared to a fully rendered predicted game state.

In some examples of the computer-readable storage medium, the instructions may include transmitting the rendered predicted game state to the game client such that a lag time of presenting the rendered predicted game state at the game client is less than a predefined threshold.

The instructions may further include determining the predicted game state based on one or more game client specific attributes, where the one or more game client specific attributes may include at least one from a set of a position, a view point, equipment, and a character state of the game client at the first game state. The one or more game client specific attributes may further include at least one from a set of an aggressiveness, a speed, and a predictability of the game client at the first game state.

According to some examples, a cloud-based game server for speculatively rendering game states is provided. The cloud-based game server may include a memory; and a processor coupled to the memory. The processor may be configured to: detect a first game state of a game client; identify a state transition based on the first game state; determine a number of predicted game states according to whether the probability for the one or more potential subsequent states associated with the identified state transition exceeds the probability threshold defined based on one or more of a game rule, a game scenario, a usage history of the game client, a usage history of a group of game clients, a computational cost, and/or a network cost; determine a computational load for rendering each of the predicted game states; render one or more of the predicted game states based on the probability and the computational load associated with rendering each predicted game state; detect the second game state of the game client; determine whether the second game state corresponds to one of the one or more rendered predicted game states; if the second game state corresponds to one of the one or more rendered predicted game states, transmit the one or more corresponding rendered predicted game states to the game client; and discard remaining rendered predicted game states that do not correspond to the second game state.

In various examples of the cloud-based game server, the processor may be configured to transmit and store at least a subset of the rendered predicted game states at the game client based on the determined network load.

In some examples of the cloud-based game server, the processor may be configured to, in response to determining a first predicted game state has a greater probability than a second predicted game state, expend additional computational effort to render the first predicted game state compared to rendering the second predicted game state.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for speculative graphics rendering in cloud-based gaming, the method comprising:
    detecting a first game state of a game client;
    identifying a state transition based on the first game state, the state transition including an initial game state, one or more potential subsequent game states, and a probability for each of the one or more potential subsequent states based on the initial game state;
    determining a predicted game state according to whether the probability for one or more potential subsequent states associated with the identified state transition exceeds a probability threshold, wherein the probability threshold is determined based on one or more of a game rule, a game scenario, a usage history of the game client, a usage history of a group of game clients, a computational cost, and/or a network cost;
    rendering the predicted game state;
    detecting a second game state of the game client based on a detected action of a player in a game;
    determining whether the second game state corresponds to the rendered predicted game state; and
    if the second game state corresponds to the rendered predicted game state, transmitting the rendered predicted game state to the game client; else
    rendering the detected second game state of the game client.

2. The method of claim 1, further comprising:
    determining a plurality of predicted game states according to whether the probability for the one or more potential subsequent states associated with the identified state transition exceeds the probability threshold;
    rendering the predicted game states;
    detecting the second game state of the game client;
    determining whether the second game state corresponds to one of the rendered predicted game states;
    if the second game state corresponds to one of the rendered predicted game states, transmitting the corresponding one of rendered predicted game states to the game client; and
    discarding remaining rendered predicted game states that do not correspond to the second game state.

3. The method of claim 2, further comprising:
    determining a network load for transmitting the rendered predicted game states; and
    transmitting and storing at least a subset of the rendered predicted game states at the game client based on the determined network load.

4. The method of claim 2, further comprising:
    in response to determining a first predicted game state has a greater probability than a second predicted game state, expending additional computational effort to render the first predicted game state compared to rendering the second predicted game state.

5. The method of claim 1, further comprising:
    identifying the state transition from a database of state transitions; and updating the database of state transitions with one of the rendered predicted game state and the second game state depending on whether the rendered predicted game state corresponds to the detected second game state.

6. The method of claim 1, further comprising updating the probability threshold depending on whether the rendered predicted game state corresponds to the detected second game state.

7. A cloud-based game server adapted to speculatively render game states, the server comprising:
a memory; and
a processor coupled to the memory, the processor configured to:
detect a first game state of a game client;
identify a state transition based on the first game state;
determine one or more predicted game states according to whether a probability for one or more potential subsequent states associated with the identified state transition exceeds a probability threshold, wherein the probability threshold is determined based on one or more of a game rule, a game scenario, a usage history of the game client, a usage history of a group of game clients, a computational cost, and/or a network cost;
determine a number and a type of the one or more predicted game states to render based on one or more factors including a processing capacity, a bandwidth availability, and a complexity of the rendered predicted game state;
render at least one of the predicted game states based on the determination before detecting a subsequent game state at the game client;
detect a second game state of the game client;
determine whether the second game state corresponds to the at least one rendered predicted game state; and
if the second game state corresponds to the at least one rendered predicted game state, transmit the at least one rendered predicted game state to the game client; else
render the detected second game state of the game client.

8. The server of claim 7, wherein the processor is further configured to update the probability threshold depending on whether the at least one rendered predicted game state corresponds to the detected second game state.

9. The server of claim 7, wherein the processor is further configured to dynamically adjust the probability threshold based on one or more of a computational load for rendering the one or more predicted game states and/or a network load for transmitting the at least one rendered predicted game state.

10. The server of claim 7, wherein the processor is further configured to render the at least one predicted game state partially with one of fewer scene components and/or lower scene resolution compared to a fully rendered predicted game state.

11. The server of claim 7, wherein the processor is further configured to transmit the at least one rendered predicted game state to the game client such that a lag time of presenting the at least one rendered predicted game state at the game client is less than a predefined threshold.

12. The server of claim 7, wherein the processor is further configured to determine the one or more predicted game states based on one or more game client specific attributes including one or more of: a position, a view point, equipment, a character state of the game client at the first game state, an aggressiveness, a speed, and a predictability of the game client at the first game state.

13. A computer-readable storage medium having instructions stored thereon for speculative graphics rendering in cloud-based gaming, the instructions comprising:
detecting a first game state of a game client;
identifying a state transition based on the first game state, the state transition including an initial game state, one or more potential subsequent game states, and a probability for each of the one or more potential subsequent states based on the initial game state;
determining a predicted game state according to whether the probability for one or more potential subsequent states associated with the identified state transition exceeds a probability threshold, wherein the probability threshold is determined based on one or more of a game rule, a game scenario, a usage history of the game client, a usage history of a group of game clients, a computational cost, and/or a network cost;
rendering the predicted game state at the game client before a subsequent action is entered by a player at the game client;
detecting a second game state of the game client based on an observed action of a player in a game;
determining whether the second game state corresponds to the rendered predicted game state; and
if the second game state corresponds to the rendered predicted game state, transmitting the rendered predicted game state to the game client; else
rendering the detected second game state of the game client.

14. The computer-readable storage medium of claim 13, wherein the instructions further comprise:
determining a plurality of predicted game states according to whether the probability for the one or more potential subsequent states associated with the identified state transition exceeds the probability threshold;
rendering the predicted game states;
detecting the second game state of the game client;
determining whether the second game state corresponds to one of the rendered predicted game states;
if the second game state corresponds to one of the rendered predicted game states, transmitting the corresponding one of the rendered predicted game states to the game client; and
discarding remaining rendered predicted game states that do not correspond to the second game state.

15. The computer-readable storage medium of claim 13, wherein the instructions further comprise determining the predicted game state based on one or more game client specific attributes.

16. The computer-readable storage medium of claim 15, wherein the one or more game client specific attributes include at least one from a set of a position, a view point, equipment, and a character state of the game client at the first game state.

17. The computer-readable storage medium of claim 16, wherein the one or more game client specific attributes further include at least one from a set of an aggressiveness, a speed, and a predictability of the game client at the first game state.

18. A cloud-based game server to speculatively render game states, the server comprising:
a memory; and
a processor coupled to the memory, the processor configured to:
detect a first game state of a game client;
identify a state transition based on the first game state, the state transition including an initial game state, one or more potential subsequent game states, and a probability for each of the one or more potential subsequent states based on the initial game state;

determine a plurality of predicted game states according to whether the probability for the one or more potential subsequent states associated with the identified state transition exceeds a probability threshold defined based on one or more of a game rule, a game scenario, a usage history of the game client, a usage history of a group of game clients, a computational cost, and/or a network cost;

determine a computational load for rendering each of the predicted game states;

render one or more of the predicted game states based on the probability and the computational load associated with rendering each predicted game state at a local server node of the game server;

distribute the rendered one or more of the predicted game states from the local server node to the game client before a subsequent action is entered by a player at the game client;

detect a second game state of the game client;

determine whether the second game state corresponds to one of the one or more rendered predicted game states;

if the second game state corresponds to one of the one or more rendered predicted game states, transmit the one or more corresponding rendered predicted game states from the local server node of the game server to the game client; and discard remaining rendered predicted game states that do not correspond to the second game state.

19. The server of claim 18, wherein the processor is further configured to:

transmit and store at least a subset of the rendered predicted game states at the game client based on a determined network load.

20. The server of claim 19, wherein the processor is further configured to:

in response to determining a first predicted game state has a greater probability than a second predicted game state, expend additional computational effort to render the first predicted game state compared to rendering the second predicted game state.

* * * * *